Feb. 21, 1967    A. A. McCOY    3,305,466
METHOD OF AND APPARATUS FOR REACTING GAS AND SOLIDS
Filed July 26, 1965    2 Sheets-Sheet 2

INVENTOR.
ABRAM A. McCOY
BY Horace B. Van Valkenburgh
ATTORNEY 3,305,466
METHOD OF AND APPARATUS FOR REACTING GAS AND SOLIDS
Abram Armstrong McCoy, deceased, late of Boulder County, Colo., by Ruthanna McCoy Evans, special administratrix, La Salle, Colo. (3309 Mary Lynn Drive, Des Moines, Iowa 50322)
Filed July 26, 1965, Ser. No. 479,034
15 Claims. (Cl. 204—164)

This application is a continuation-in-part of copending application Serial No. 142,425, filed October 2, 1961 (now abandoned).

This invention relates to a method for reacting a gaseous reactant with comminuted solids and to apparatus for carrying out such a reaction, particularly when one of the reaction products can be produced in gaseous form.

The method of this invention is particularly applicable to a reaction between a gaseous or vaporized reactant and a solid which can be comminuted and which, in comminuted form, is susceptible to the effect of an alternating electrical current, particularly of a relatively high voltage but of a low amperage and adapted to provide an alternating electrostatic field. The method of this invention has been found to be particularly applicable to the reaction of chlorine or a chlorine containing, gaseous reactant, such as vaporized carbon tetrachloride, with an ore containing one or more of the metals tungsten, molybdenum, niobium or iron. As will be evident, the method of this invention is applicable to the reaction between numerous other gaseous or vaporous reactants and numerous other comminuted solids.

Among the objects of this invention are to provide a novel method for reacting a gaseous reactant with comminuted solids; to provide such a method which produces an improved contact between the gaseous or vaporized reactant and the comminuted solids; to provide such a method in which the comminuted solids are agitated at a rapid rate in the reaction zone; to provide such a method which produces a marked reduction in the reaction time; to provide such a method which permits the reaction to be carried out continuously; to provide such a method which may be carried out efficiently and effectively; to provide apparatus particularly adapted to carry out the method of this invention; to provide such apparatus which is relatively simple in construction and economical in operation; to provide such apparatus which does not require any moving parts in the reaction zone and particularly does not require mechanical means for moving the comminuted solids through the reaction zone; to provide such apparatus in which the comminuted solids, the gaseous reactant and the reaction products, both solid and vapor, may all be readily introduced into or removed from the reaction zone; and to provide such apparatus which is efficient and effective in operation.

Additional objects and the novel features of this invention will become apparent from the description which follows. In general, the method of this invention comprises introducing the comminuted solids adjacent the upper end of an inclined reaction zone, introducing the gaseous reactant adjacent the lower end of the inclined reaction zone, and subjecting the reaction zone to an electrical field produced by an alternating electric current of relatively high voltage but low frequency. Due to the inclination of the reaction zone, the comminuted solids tend to move downwardly by gravity, but the alternating electric field produces a rapid and relatively violent agitation of the solid particles. This agitation not only causes the solid particles to move more readily through the reaction zone, tending to decrease contact of the particles with the lower wall of the enclosure which forms the reaction zone, but also enhances the contact between the gaseous reactant and the particles, thereby promoting a rapid and more complete chemical reaction. The electrical field also promotes the reaction, increasing the reaction rate to a drastic extent, possibly through ionization of the gaseous reactant or strain imposed on the molecular structure of the particles of solid, or possibly a combination of both. Conveniently, the gaseous reactant is introduced into the lower end of the reaction zone and the resultant solid particles, after reaction, are also conveniently removed from the lower end of the reaction zone. The reaction zone is also maintained at a temperature such that either at the time of the reaction or afterward, one or more desired reaction products is produced in a gaseous or vapor state, such vapor reaction product or products being conveniently withdrawn from the upper end of the reaction zone. It will be evident that, through the introduction of the comminuted solids to be reacted at the upper end of the reaction zone and the introduction of the gaseous reactant at the lower end of the reaction zone, the reactants move through the reaction zone in a counter current relationship, thereby enhancing the probability of a complete reaction of all comminuted solids introduced into the reaction zone.

The above method of this invention is particularly adapted to be carried out by apparatus constructed in accordance with this invention, illustrated in the accompanying drawings, in which.

Figure 1:
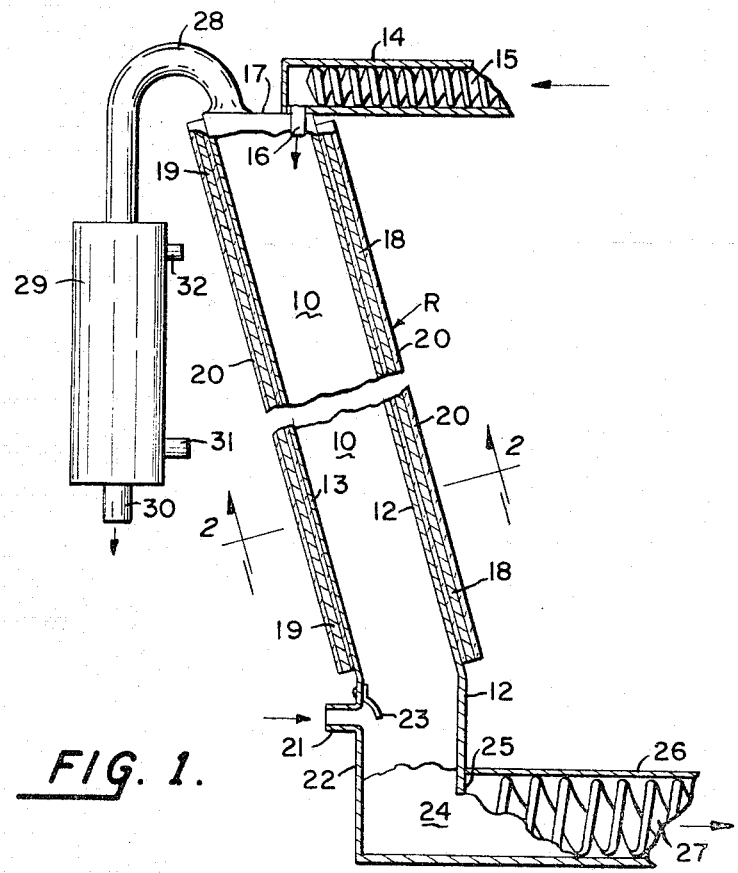
FIG. 1 is a partially diagrammatic, condensed side elevation, partly in section and on a greatly reduced scale, of apparatus constructed in accordance with this invention.
Figure 2:
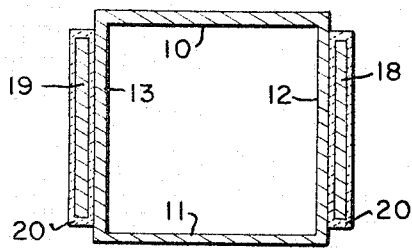
FIG. 2 is a cross section, on a larger scale, taken along line 2—2 of FIG. 1.

Apparatus constructed in accordance with this invention, as in FIGS. 1 and 2, includes an inclined reactor R, disposed at a suitable angle to the horizontal, preferably from 30° to 75°, such as 75° as shown, and having side walls 10 and 11 and end walls 12 and 13, the latter of which for convenience are referred to as an upper wall 12 and a lower wall 13. A screw conveyor which includes a housing 14 and a rotating screw 15 therein, or any other suitable device for feeding comminuted solids to be reacted into the reactor R, moves the solids to an inlet 16 which extends through top 17 of the reactor. The conveyor is conveniently disposed in horizontal position, while the rate of rotation of screw 15 is preferably adjusted so that the housing 14 will be completely filled with comminuted solids, adjacent inlet 16, to act as a seal at the upper end of the reactor, although a seal is not normally an acute problem, as the reaction may usually be carried out at atmospheric pressure. As the comminuted solids are discharged into the upper end of the reactor R from the screw 15, they will fall downwardly in the reactor, but are relatively violently agitated by an alternating electrostatic field, produced by an alternating current of relatively high voltage, such as above 10,000 volts, produced by current passing through a pair of conveniently flat electrodes 18 and 19, mounted on the opposite walls 12 and 13 and provided with insulation 20, such as ceramic. The electrodes 18 and 19 are connected, by conventional wires or electrical cables, with a suitable source of alternating current of conventional or other lower frequency, such as a variable transformer, which will supply current at the required voltage, such as above 10,000 volts. The frequency is most conveniently the conventional 60-cycle, although other low frequencies may be utilized. In some instances, it may be desirable to vary the voltage during the reaction period, as when the particle size of the comminuted solids changes. The alternating electrical field not only agitates the particles, improving the contact between the reactant gas and the solids, but also apparently promotes the chemical reaction, as pointed out above. Although single phase current is preferred, there may be situations in which a supply of three phase current may be used, in which three electrodes instead of two will be used. In the latter instance, it may be desirable to form the reactor R with a cross section which is triangular in shape, with one electrode on each side and connected to one phase.

The interior of the reactor R should be at a temperature above the temperature at which at least one, or more if desired, of the reaction products become a vapor. At the start of the reaction, since the electrostatic field does not heat the particles, it may be desirable to preheat the comminuted solids, the reaction gas, or both, before introduction into the reaction chamber, while such preheating may be continued if necessary to maintain the desired temperature. However, many reactions are exothermic, such as the production of metal chlorides, so that no additional heat might be necessary during the reaction, but in fact cooling may be required, which may be accomplished by conventional cooling tubes surrounding or extending longitudinally of the reactor R. Also, the amount of heat to be supplied or extracted during reaction may depend upon other factors. Thus, a relatively high grade ore would probably require cooling, while a low grade ore would probably require additional heat. Conveniently, the walls of the reactor are formed of non-magnetic material, such as non-magnetic stainless steel or other suitable non-magnetic material which will withstand the reaction temperatures and also the reactant gases, such as chlorine. The walls of the reactor may, of course, be formed of ceramic or the like.

The reaction gas or vapor is introduced through an inlet 21 at the lower end of the reactor, conveniently in a lower vertical extension 22 of wall 13, the gas or vapor flowing upwardly in reactor R to contact the agitating particles. A deflector 23, above gas inlet 21, prevents spent or reacted solids from clogging the inlet. The solid products of reaction will eventually fall to the lower end of reactor R and there collect in a pile 24, which is conveniently permitted to accumulate to the height of the lower edge of a lower extension 25 of wall 12, which preferably extends downwardly below the top of a housing 26 for a screw 27, which is rotated in an appropriate direction to remove the solid products of reaction. The end of screw 27 is spaced from the lower end of extension 25, so as to maintain the pile 24 of reactor material, which acts as a seal for the lower end of the reactor. It will be understood, of course, that any other suitable device for introducing the comminuted solids and removing the solid products of reaction may be utilized, such introduction and removal devices conveniently being such that a seal is formed at both the points of introduction and removal.

The gaseous reaction products, which are gaseous or vapor either during formation or thereafter, pass upwardly to the upper end of reactor R and through an outlet tube 28, by which they are conveyed to a condenser 29, which may be provided with any suitable type of passageway for condensing the gases which, after condensation, pass through outlet 30, at the lower end of the condenser for further treatment or other desired disposition. It will be noted that many metal chlorides, for instance, do not condense as a liquid but pass directly from the gaseous to the solid state. Thus, in such a case, the passage for the reaction product gases should be so shaped that any collection of solid particles which might tend to obstruct the passageway will be obviated. Or, the condenser passage may be vibrated periodically to dislodge collected solid particles. The condenser 29 may be provided with a coolant inlet 31 and a coolant outlet 32, by which a suitable coolant, either gaseous or liquid, depending upon the amount of cooling which is to take place, may be passed through the condenser, conveniently in countercurrent relation to the gaseous reaction product or products. Of course, if more than one gaseous reaction product is produced, the condenser 39 may be utilized to condense out one of the gaseous reaction products, the other passing to a second condenser for condensation therein. Or, if the type of gaseous reaction product indicates the desirability thereof, the gaseous reaction product may be treated further in gaseous form.

Figure 3:
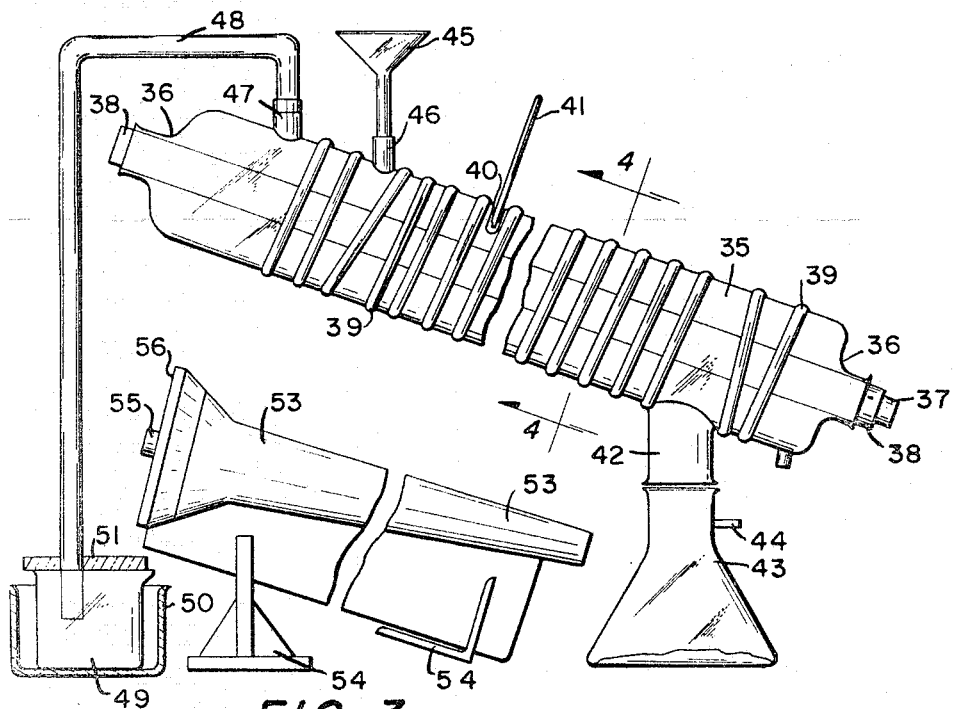
FIG. 3 is a condensed side elevation of an alternative apparatus constructed in accordance with this invention, as for use on a laboratory scale.
Figure 4:
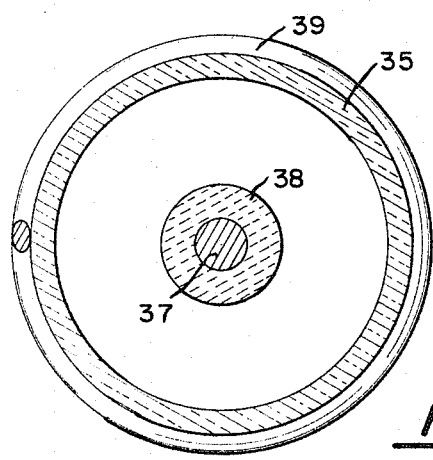
FIG. 4 is a cross section, on a larger scale, taken along line 3—3 of FIG. 4.

Apparatus also constructed in accordance with this invention, particularly adapted for use in carrying out the reaction with smaller quantities of material, as in a laboratory, as illustrated in FIGS. 3 and 4, may include a reaction tube 35, inclined at a suitable angle to the horizontal, such as 30°, and formed of Pyrex glass or any other suitable material. When the reaction is carried out on a laboratory scale, it is normally desired to observe the reaction while taking place. Each end 36 of the tube 35 may be bell-shaped, with a central, circular opening, to accommodate a metal rod 37 provided with insulation 38, conveniently ceramic, the rod 37 acting as a central electrode and the other electrode 39, such as nichrome wire, conveniently being wound about the outside of the tube 35 and requiring no insulation, when tube 35 is formed of insulating material. The convolutions of outer electrode 39 are preferably spaced apart, as shown, to permit observation of the reaction and particularly the particle movement within tube 35. The ends of the electrodes 37 and 39 are connected to the opposite terminals of a source of alternating current at a relatively high voltage, such as over 10,000 volts, conveniently including means for varying the voltage as desired. The tube 35 is conveniently provided with a well 40 formed centrally in the upper edge thereof and in which a thermometer 41 may be inserted, in order to measure the reaction temperature inside the tube.

Adjacent its lower end and on the underside, tube 35 may be provided with an inlet connection 42, for the introduction of the reactant gas or vapor, conveniently produced by heating a liquid, if not already a gas, placed in a flask 43, in which the solid products of reaction collect after moving to the lower end of tube 35. The liquid in flask 43, such as carbon tetrachloride, my be heated by a Bunsen burner or electric heater, while heated, desiccated air may be supplied through a flask connection 44, to carry the vapors into the reaction zone and also supply oxygen for the reaction. A suitable seal, of a conventional character and therefore not shown, is provided between the neck of flask 43 and reactant gas inlet 42. The comminuted solids are conveniently fed through a funnel 45, the neck of which is inserted in a funnel connection 46 formed in tube 35, with a sufficient small passage in the funnel neck that the divided solids, as poured into the funnel 45, will form a seal at the comminuted solid inlet, although as indicated, a seal is not an acute problem, when the reaction is carried out at atmospheric pressure. As will be evident, as the comminuted solids drop into the interior of tube 35 and begin to move downwardly therein, they will be relatively violently agitated by the alternating current field produced between the electrodes 37 and 39 and will move downwardly by gravity to the gas inlet 42, conveniently also an outlet for solid products of reaction. During this passage through tube 35, the comminuted solids will be contacted by the reaction gas and the gaseous or vapor products of reaction will flow through a gas outlet 47, formed near the upper end of tube 45, although the relative positions of solids inlet connection 46 and gas outlet 47 may be reversed. From outlet 47, the gaseous products of reaction will flow through a tube 48 to a condensing beaker 49, which may be merely an air condenser but may be externally cooled, if desired, as by water or ice in an outer beaker 50. Tube 48 conveniently extends through a hole in a cover plate 51 for beaker 49, the cover plate 51 being formed of ceramic, asbestos or other suitable material and being tipped slightly or spaced slightly from one side of beaker 49 to permit the escape of non-condensed gases in which there is no interest in recovering. The condensed gaseous products of reaction, such as solid particles, will collect in beaker 49.

In order to maintain the reaction zone in tube 35 at a temperature above the vapor forming temperature of at least one reaction product, an elongated burner 53 is disposed beneath the tube 35 and is conveniently shielded for more effective heating. The burner 53 is supported in an inclined position, corresponding to the inclination of tube 35, such as approximately 30° to the horizontal, by a stand 54. The burner 53 is conventional, being provided with a gas inlet 55, an air intake 56 and an elongated, longitudinal orifice in the top thereof, or a series of holes, through which the gas flame or flames issue.

The following examples are given as indicative of the general types of reactions which may be carried out in accordance with this invention, it being understood that the method and apparatus of this invention may be utilized in carrying out numerous other reactions between a gaseous reactant or reactants and comminuted solids.

*Example 1*

Recovery of tungsten from mill tailings.

A ferberite ore, containing tungsten, in the form of mill tailings analyzing 1.30% $WO_3$ by weight and comprising particles of −65 to +100 mesh, was used. 150 grams of the particles were fed through the inlet funnel of apparatus as shown in FIG. 3, the reaction tube of which was heated to a temperature of about 300° C. by the gas burner. Carbon tetrachloride was placed in the gas inlet flask and dry, desiccated air fed into the flask to carry $CCl_4$ vapors into the reaction tube. The voltage between the inner and outer electrodes was brought up, through a variable transformer connected to a conventional source of 110-volt, 60-cycle current, until the ore particles began to move and then upwardly to 12,000 volts, at which the particles moved so rapidly that they appeared as a dense cloud in the reaction tube i.e., a homogeneous suspension. The reaction was very rapid, with bright red fumes of $WOCl_4$ passing out the gas exit near the upper end of the tube and into the air condenser. The reaction appeared to be complete about one-third of the way up from the lower end of the reaction tube. The tails, i.e. the solid particles remaining after the reaction and weighing 138 g., were assayed and found to contain 0.07% $WO_3$. On this basis, it was calculated that the recovery of tungsten was 94.6% by weight.

The mechanism of the ferberite chlorination is probably as follows:

(1A) $2FeWO_4 + 4CCl_4 + O_2 \rightarrow 2FeCl_3 + 2WOCl_4 + Cl_2 + 4CO_2$ (1B) $4FeWo_4 + 8CCl_4 + O_2 \rightarrow 4FeCl_3 + 4WOCl_4 + 2COCl_4 + 6CO_2$ It will be noted that $FeCl_3$ as well as $WOCl_4$ is produced. However, $FeCl_3$ is water soluble and can readily be removed by aqueous leaching.

In connection with the above Example 1, it will be noted that the ferberite ore tailings used were tailings from the conventional processing of a ferberite ore which slimes so badly in the conventional physical upgrading process, that a considerable amount of tungsten is lost in the mill tailings. There is apparently no physical process which can recover these values economically, while the large quantity of quartz present makes any hydrometallurgical method uneconomical.

*Example 2*

Recovery of molybdenum from low grade ore.
A synthetic sulfide-oxide mix, i.e., $MoS_2$ and $$MoS_2 \cdot Fe_2O_3 \cdot H_2O$$

in the form of particles of −65 to +100 mesh was used, 250 grams of these particles being fed through the inlet funnel into the reaction tube, which was heated to about 400° C. by the gas burner. Dry, desiccated air was passed into the heated flask containing carbon tetrachloride and the voltage between the inner and outer electrodes was raised to 12,000 volts. The reaction was rapid and the gaseous reaction product, i.e., $MoCl_5$, proceeded through the gas outlet to the air condenser. The head particles assayed 0.15% Mo as contained in $MoS_2$ and 0.18% Mo as contained in $MoO_3$, or a total of 0.344% Mo, while the 236 g. of tailings particles recovered assayed 0.020% Mo. On this basis, it was calculated that the recovery of molybdenum was 94.4% by weight.

In the above Example 2, since most of the $MoS_2$, i.e., about 90%, is converted to $MoO_3$ by the oxidizing conditions at the reaction temperature, two equations can be written, namely:

(2A) $2MoO_3 + 4CCl_4 + O_2 \rightarrow 2MoCl_5 + 4CO_2 + 3Cl_2$ (2B) $21O_2 + 8MoS_2 + 16CCl_4 \rightarrow 8MoCl_5 + 8SO_2 + 2COCl_2 + 6Cl_2 + 4S_2Cl_2 + 4CO + 10CO_2$ Equation (2B) is a summation of the following equations:

(2B1) $2MoS_2 + 7O_2 \rightarrow 2MoO_3 + 4SO_2$ (2B2) $2MoS_2 + 4CCl_4 + O_2 \rightarrow 2MoCl_5 + 2COCl_2 + 2CS_2 + Cl_2$ (2B3) $2MoS_2 + 4CCl_4 + 2O_2 \rightarrow 2MoCl_5 + 2S_2Cl_2 + Cl_2 + 4CO$ (2B4) $2MoS_2 + 4CCl_4 + 4O_2 \rightarrow 2MoCl_5 + 2S_2Cl_2 + Cl_2 + 4CO_2$ (2B5) $2CS_2 + 2O_2 \rightarrow 2CO_2 + 4SO_2$ In connection with the above Example 2, it will be noted that the mineral molybdite, $MoO_3$, is often associated with the major mineral of molybdenum, molybdenite, $MoS_2$. Conventional milling techniques can recover, at best, only 90% of the molybdenite and none of the molybdenite, or more properly ferromolybdite.

*Example 3*

Recovery of niobium from low grade ore.
A low grade niobium ore, i.e., a Canadian Pyrochlore ore, $(Na,Ca)_2(Nb,Ti)_2(O,F)_2$, was used. A screen test of the ore particles gave the following results:

|  | Percent |
|---|---|
| +35 mesh | 0.15 |
| −35 to +65 mesh | 1.2 |
| −65 to +100 mesh | 3.35 |
| −100 to +200 mesh | 32.4 |
| −325 to +400 mesh | 38.45 |
| Total | 100.00 |

When 250 g. of the above particles were introduced into the reaction tube, heated to about 300° C. by the gas burner and filled with $CCl_4$ vapors carride therein by desiccated air, and the voltage between the electrodes was raised to 12,000 volts, the reaction proceeded almost instantaneously and violently, before the particles began moving. However, the head assayed 0.66% $Nb_2O_5$ and the tails 0.02% $Nb_2O_5$, with 246 g. of tails being recovered. On that basis, it was calculated that the recovery of niobium was 96.9%.

The above reaction apparently proceeded in accordance with the following equation:

(3) $Nb_2O_5 + 4CCl_4 \rightarrow NbOCl_3 + NbCl_5 + 4COCl_2$

It is believed that the violence and instantaneousness of the reaction may have been due to the formation of free radicals from the carbon tetrachloride, at the temperature involved, as follows:

(3A) $CCl_4 \rightleftarrows CCl_3^+ Cl^-$ (3B) $CCl_3^+ \rightleftarrows CCl_2^{++} + Cl^-$ (3C) $CCl_2^{++} \rightleftarrows CCl^{+++} + Cl^-$ Apparently, the free radicals and nascent chlorine are very powerful chlorinating agents. The presence of such free radicals is evidenced by the combinations thereof which have been isolated from carbon tetrachloride heated to such a temperature, for example:

|  | M.P.,° C. | B.P.,° C. |
|---|---|---|
| Hexachlorobenzene $C_1Cl_6$ | 228 | 309 |
| Hexachlorethane $C_2Cl_6$ | 187 | 184 |
| Tetrachlorethene $C_2Cl_4$ | −22 | 121 |

Of course, in the presence of air or oxygen, carbon tetrachloride, at such temperatures, also produces phosgene or $COCl_2$, which will dissociate to form $Cl_2$ and $CO$.

In connection with Example 3, above, it will be noted that over 90% of the particles were −100 mesh, and that the particles did not tend to move. In order to test the effect of particle size upon movement, several different sizes of particles were placed in the reactor, without heating, and without the introduction of a reaction gas, the voltage between the electrodes then being increased, up to 18,000 volts. Tungsten ore particles, similar to those of Example 1 but of −40 to +65 mesh moved sluggishly, while tungsten ore particles of −100 mesh and of −400 mesh also moved sluggishly. Thus, it was concluded that the preferable size of tungsten ore particles should be −65 to +100 mesh. It was also found that particles of magnetite, $Fe_3O_4$, could be moved only with difficulty, even with voltages as high as 18,000 volts, regardless of the particle size. However, particles of quartz, $SiO_2$, moved well in the preferred size range. It would be expected, of course, that other and different mineral or ore particles might have a preferable range of particle size differing from the tungsten ore particles, although the preferred range for the tungsten particles will provide a basis for determining the optimum range of particle sizes for other ores or particles. It will be noted, of course, that the optimum range of particle size for the tungsten ore treated was determined with the reactor tube at an angle of 30°. Thus, when the tube was inclined at a greater angle to the horizontal, the particles tended to move more readily, so that with a greater inclination of the reaction zone, a greater range of particle sizes can be more readily treated.

It was also found that a minor proportion of dust or extremely small particles, when added to the particles of the preferred range of size, would move with the other particles, so that a minor proportion of dust does not present any problem. Of course, in order to carry out the chemical reaction, the grind must be sufficiently fine to expose the ore particles in the quartz or gangue, so that the optimum range of particle size will normally be found within the range necessary for adequate reaction results.

In addition to chlorine and carbon tetrachloride, reaction gases or vapors which may be utilized include phosgene, $COCl_2$, sulfur monochloride, $S_2Cl_2$, and numerous others, as will be evident to those skilled in the art. Since most of the metal chlorides tend to be unstable in the presence of moisture and to hydrolyze to non-volatile oxides, when chlorine or a chlorine containing reactant is used as the reaction gas, it is desirable to carry out the reaction under anhydrous or substantially anhydrous conditions. Also, as indicated above, the reaction temperature should be such that the metal chloride or other desired product of reaction, such as a carbonyl, will have a boiling point below the reaction temperature.

In addition to the tungsten, molybdenum and niobium ores treated in the above examples, it will be evident that ores containing other metals or minerals may be treated similarly. Thus, the following Table I lists the metals which have been shown to be or should be susceptible to treatment in accordance with the present invention.

TABLE I

| | |
|---|---|
| Aluminum | Manganese |
| Anitmony | Molybdenum |
| Arsenic | Niobium |
| Beryllium | Selenium |
| Chromium | Tantalum |
| Callium | Titanium |
| Germanium | Tin |
| Gold | Tungsten |
| Hafnium | Vanadium |
| Iron | Zirconium |

In addition to the metals or minerals which may be recovered, there are also other metals and minerals which may exist concurrently or as contaminants in the ore or mineral being treated, but which in the chloride form may be removed by aqueous leaching. The metals listed in Table II are those which have been or should be able to be removed by such leaching.

TABLE II

| | |
|---|---|
| Copper | Thorium |
| Lead | Uranium |
| Rare earths | Zinc |

The above are, of course, in addition to the metals of Table I which might be appropriately leached, such as when molybdenum is to be recovered from an ore also containing iron.

Metals which may be volatilized as carbonyls or as carbonyl chlorides, with appropriate reaction gases, include copper, iron, molybdenum, nickel, tungsten and members of the platinum group. For conversion of metals to carbonyls, the reaction gas may be carbon monoxide, $CO$.

The method and apparatus of this invention may also be utilized to remove an undesirable gangue or accessory mineral, in an upgrading technique. Thus, large quantities of iron and tungsten may be separated from the more valuable scandium, in a scandium bearing ferberite. Also, tin and niobium may be removed from a scandium bearing tin-niobium placer or concentrate. The normally troublesome antimony may be removed from boulangerite ores, i.e., a lead-antimony sulfide, to produce a material more acceptable to a smelter. Or, iron can be removed from a low grade bauxite, thereby producing a premium product.

It will be understood that the method and apparatus of this invention may be utilized in recovering a volatile compound or compounds from the reaction of comminuted solids and a reactant gas in numerous other instances, particularly where one or more of the reaction products can be volatilized, as will be evident to those skilled in the art.

From the foregoing, it will be evident that the method and apparatus of this invention fulfill to a marked degree the requirements and objects hereinbefore set forth. Thus, the method and apparatus provide an improved contact between the gaseous or vaporized reactant and the comminuted solids, while the solids are agitated at a rapid rate in the reaction zones. As will also be evident, the reaction may be carried on continuously while the apparatus does not require any moving parts in the reaction zone and particularly does not require any mechanical means for moving the comminuted solids through the reaction zone. As will further be evident, the introduction of both the comminuted solids and the gaseous reactant, into the reaction zone, as well as the removal of the reaction products, both gaseous and solids particles, may be carried out in a simple and facile manner.

A comparison of the method and apparatus of the present invention, with the four principal types of equipment previously utilized for gas-solid contact reactions, will serve to emphasize the valuable attributes of the method and apparatus of the present invention. The simplest, but most unsatisfactory type of prior equipment is a horizontal tube containing a static bed of particles. Since a bed of ore is placed in the tube and the reaction gas is passed over the static charge, the gas-solid contact is very poor and the batch nature of the process renders it uneconomical.

Another type of equipment is a vertical tube containing a static bed of particles, through which the reactant gas is passed. Although the process may be continuous, due to poor contact and particularly the channeling of the gases through the charge, the extraction is very poor and the process therefore uneconomical, except perhaps in the instance of very high grade ore or concentrates. Thus, this equipment is particularly uneconomical with low grade material.

Another equipment utilized is the fluid bed, which is similar to the vertical tube, but in which the reagent gas is blown through the bottom of the tube with sufficient velocity to maintain the particles in a state of fluidity or constant motion. However, the numerous mechanical problems involved in performing a continuous operation with this type of equipment make it highly uneconomical in many instances. Often, the characteristics of the charge are such that it will either not fluidize or the volume of reaction gas necessary to maintain fluidization becomes overly excessive.

Finally, the fourth type of equipment is the rotary kiln, which is a horizontal, heated, revolving cylinder through which the charge and the reaction gas may be fed continuously. The charge is agitated by mechanical lifters, but undue difficulty in mechanical complexity is produced. One of the most difficult problems to overcome is the achievement of a moving high-temperature, corrosive resistant, gas tight seal, which is not often satisfactorily solved. In comparison therewith, the method and apparatus of the present invention does not require a moving seal, since the seal produced at the point of introduction of the particles and also at the point of removal of the reacted residue is conveniently a static seal.

Although different forms of this invention have been illustrated and described, it will be understood that other forms may exist and that various changes may be made therein, all without departing from the spirit and scope of this invention.

What is claimed is:

1. A method of reacting a gaseous reactant with comminuted solids, comprising the steps of:
   introducing an upward flow of said gaseous reactant into the lower end of an inclined, elongated reaction zone;
   introducing a flow of said comminuted solids into the upper end of said reaction zone;
   imposing an alternating electrostatic field in said reaction zone having a frequency and voltage intensity sufficient to violently agitate the said particles and cause the same to flow downwardly through the zone producing the appearance of a homogeneous suspension in the reactant gas and to flow downwardly through the inclined elongated zone against the upward flow of the gas;
   collecting gases flowing through and formed within the reaction zone at the upper end of the reaction zone as they flow upwardly through the zone, thereby producing counterflow of gas and particles through the longitudinal extent of the reaction zone to enhance a substantially complete reaction with a single pass of the particles through the gaseous reactant; and
   disposing of the particles at the lower end of the reaction zone as they move therefrom.

2. A method as defined in claim 1, including supplying heat to the reactants in said reaction zone sufficient to produce said product of the reaction in a vapor state.

3. A method as defined in claim 1, which includes preheating said comminuted solids prior to introduction into said reaction zone.

4. A method as defined in claim 1, which includes preheating said gaseous reactant prior to introduction into said reaction zone.

5. A method as defined in claim 1, wherein the voltage of said alternating electric current is above 10,000 volts.

6. A method as defined in claim 1, wherein:
   said comminuted solids are an ore containing a mineral reactable with chlorine;
   said gaseous reactant is chlorine containing; and
   said gas or vapor product of the reaction is a chloride compound of said mineral.

7. A method as defined in claim 6, wherein said comminuted solids comprise particles on the order of −65 to +100 mesh.

8. A method as defined in claim 6, wherein said comminuted solids comprise an ore containing a metal selected from the group consisting of tungsten, molybdenum, niobium and iron.

9. A method as defined in claim 8, wherein said gaseous reactant is selected from the group consisting of carbon tetrachloride, sulfur monochloride, phosgene and chlorine, in a gaseous state.

10. Apparatus for reacting a gaseous reactant with comminuted solids wherein a product of the reaction is produced in gas or vapor form, which comprises:
   a reactor having a longitudinal inclined passageway;
   means for introducing a flow of solids to the upper end of said reactor;
   means for introducing a flow of gaseous reactant to the lower end of said reactor;
   means for producing within and through said reactor passageway an alternating electrostatic field having a frequency and voltage intensity sufficient to violently agitate the particles to produce the appearance of a homogeneous suspension within the reactor and to cause a downward flow of the particles through the reactor against an upward flow of the gas;
   means for withdrawing the gas and vapor reaction products adjacent the upper end of the reactor; and
   means for removing reacted particles from the lower end of the reactor.

11. Apparatus as defined in claim 10, including spaced electrodes extending longitudinally of said reactor for producing said field.

12. Apparatus as defined in claim 10, including means for supplying heat to the reactants in said reactor sufficient to produce said product of the reaction in a vapor state.

13. Apparatus as defined in claims 10, wherein said reactor is inclined at an angle of between 30° and 75° to the horizontal.

14. Apparatus for reacting a gaseous reactant with comminuted solids wherein at least one reaction product is produced as a gas or vapor, comprising:
   a closed reactor inclined at an angle of up to about 75° to the horizontal and having a generally rectangular cross section, said reactor having walls formed of non-magnetic material;
   a pair of insulated electrodes mounted on opposed longitudinal walls of said reactor and extending longitudinally thereof, said electrodes being separately connected to opposite terminals of a source of alternating electric current having a voltage above 10,000 volts;

an inlet for reactant gas connected to one wall adjacent the lower end of said reactor, for introducing said reactant gas, the opposite wall extending below said inlet;

an inlet for comminuted solids in the top of said reactor;

a screw conveyor connected to said solids inlet for introducing comminuted solids into the upper end of said reactor;

a conveyor having a screw connected to the lower end of said reactor, for removing reacted solids, said opposite wall extending below the top of said screw and the adjacent end of said screw being spaced from said opposite wall to cause an accumulation of reacted solids to form a seal at the lower end of said reactor;

an outlet for removing gaseous products of reaction connected with the top of said reactor;

a condenser for cooling said gaseous products of reaction and having means for passage of a cooling medium therethrough; and means for conveying said gaseous products of reaction from said outlet to said condenser.

15. Apparatus for reacting a gaseous with comminuted solids, wherein a product of the reaction is produced in gas or vapor form, which comprises:

an inclined reactor;

means for introducing said solids adjacent the upper end of said reactor;

means for introducing said gaseous reactant adjacent the lower end of said reactor;

an insulated electrode disposed generally centrally of said reactor and an electrode disposed circumferentially about said reactor for producing, in said reactor, an electrostatic field; and means for withdrawing said gas or vapor reaction product adjacent the upper end of said reactor.

References Cited by the Examiner

UNITED STATES PATENTS

| | | | |
|---|---|---|---|
| 2,236,474 | 3/1941 | Hardy | 75—35 |
| 2,689,648 | 9/1954 | Maestas | 209—131 |
| 3,114,626 | 12/1963 | Dombrowski et al. | 75—10 |

JOHN H. MACK, *Primary Examiner.*

HOWARD S. WILLIAMS, *Examiner.*